July 18, 1967 K. STOLL 3,331,254
SWITCHING AND ACTUATING DEVICE
Filed May 11, 1964 4 Sheets-Sheet 1
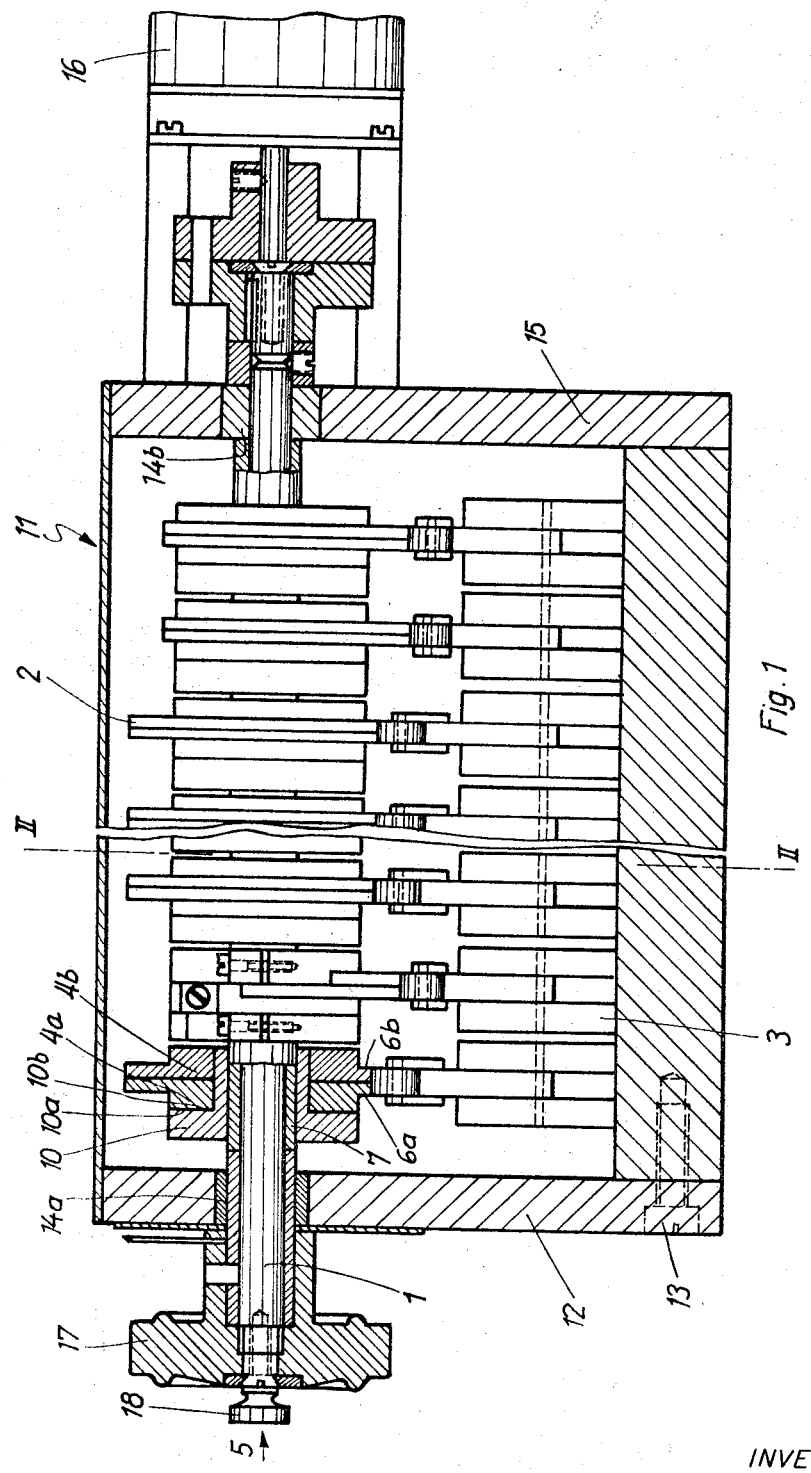
INVENTOR
KURT STOLL July 18, 1967 K. STOLL 3,331,254
SWITCHING AND ACTUATING DEVICE
Filed May 11, 1964 4 Sheets-Sheet 2
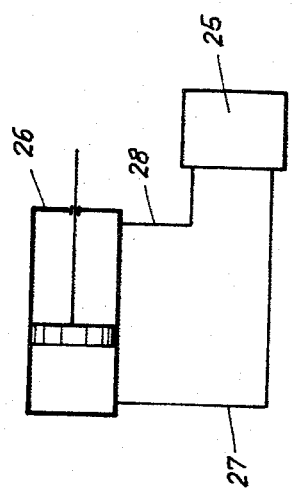
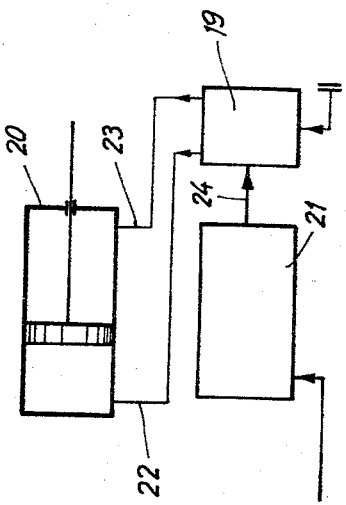
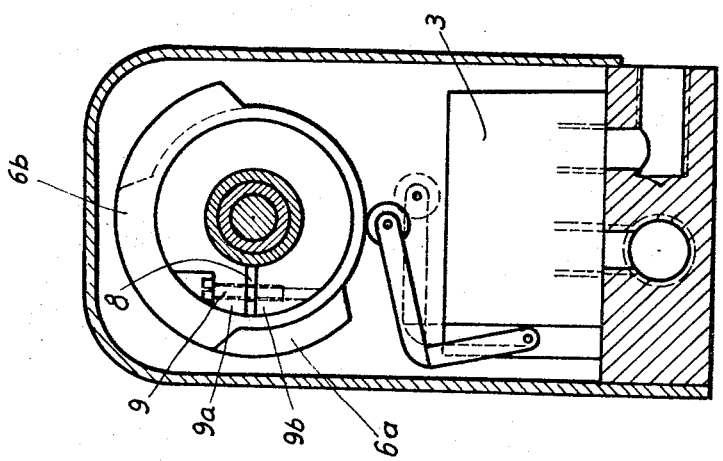
INVENTOR
KURT STOLL

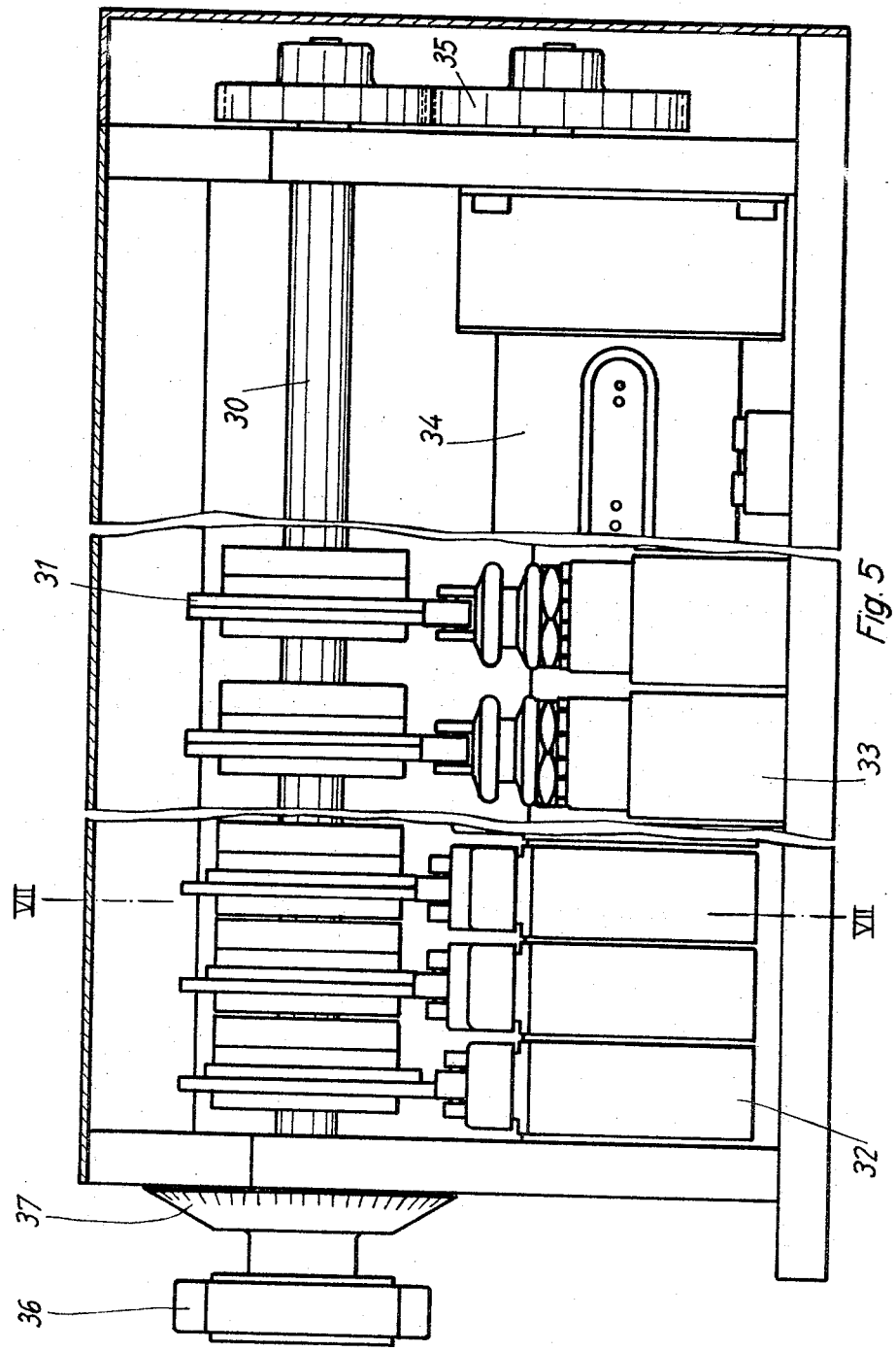

July 18, 1967 K. STOLL 3,331,254
SWITCHING AND ACTUATING DEVICE
Filed May 11, 1964 4 Sheets-Sheet 4

INVENTOR
KURT STOLL

United States Patent Office 3,331,254
Patented July 18, 1967

3,331,254
SWITCHING AND ACTUATING DEVICE
Kurt Stoll, Schanbacher Weg 48, Esslingen-Hegensberg, Germany
Filed May 11, 1964, Ser. No. 366,252
Claims priority, application Germany, May 13, 1963, F 23,886
10 Claims. (Cl. 74—54)

The invention refers to a switching and actuating device and more particularly to a switching and actuating device for determining the exact sequence of pneumatically controlled working operations pertaining to a certain working program.

It is an object of this invention to provide a device of the general character described which has a camshaft and control cams on said camshaft and pneumatic switching and controlling organs for controlling said working operations and serving to actuate in due timed relationship said pneumatic and switching organs and with which it is possible to vary at will the invervals during which the switching and operating and controlling organs in question are kept in action and also the start of the desired operation and to regulate and determine it.

A further object of this invention is to provide a device of the above-said kind with which this variation can be done off-hand and with a few manipulations only, for instance, only by loosening the set screws, and with which any interval desired can be determined by changing the relative position of the two cam disks with respect to one another taken individually as well as any angular position of the cam taken as a unit by rotating it about the camshaft according to the operations required.

Still another object of the invention is to provide a device of the kind in question the different parts of which are so shaped, arranged and co-ordinated that the device can be mounted to, and removed from the machine to be controlled just like parts of one and the same building box, whereby the program according to which the different parts are to enter into action can be composed and changed ad libitum.

A still further object of this invention consists in to provide a device of the above-said kind which has a wide field of application and is simple in construction and inexpensive in manufacture.

These and other objects, features, and advantages of the present invention will become further apparent from the following detailed description thereof.

In the drawings there are shown different embodiments of the invention.

FIG. 1 is a sectional side view of the device according to the invention;

FIG. 2 is the device according to FIG. 1 in a section along the line II—II of FIG. 1;

FIG. 3 and FIG. 4 are side views of two applications of the device in accordance with the invention;

FIG. 5 is a side view of an alternative embodiment of the invention;

Figure 7:
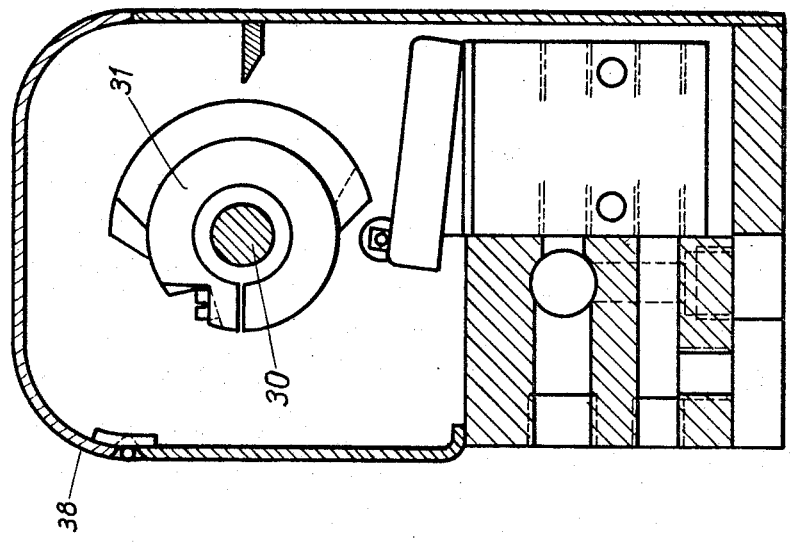
FIG. 6 and FIG. 7 are a front view and a section taken along the line VII—VII of the arrangement according to FIG. 5.

The switching device in accordance with the invention contains a control shaft 1 and control cams 2 which are provided for the actuation of the switching organs 3 that serve to control the working operations which follow each other within the respective working program. These switching organs are normal pneumatic valves 3.

FIGS. 1 and 2 show that each control cam consists of two cam disks 4a and 4b which are coaxially arranged, following each other in axial direction (arrow 5). The two disk cams, co-ordinated and allotted to each other, are placed front surface by front surface so as to bear with their front surfaces against each other and can be rotated on the control shaft 1 with respect to each other about the axis thereof, whereby their angular positions can be fixed and secured as desired. Each cam disk has cams 6a, 6b which extend over a sector of the periphery of a circle corresponding to a central angle of 180° at maximum. The cam disks 4a, 4b are rotatably arranged on a bearing sleeve 7 which is slipped on the cam shaft 1 and in its turn can be rotated thereon so that the cam disks 4a, 4b and the sleeve 7 form together a unit which can be rotated on the cam shaft itself. Thereby, it is possible to fix the cam disks individually—in case they are rotated with respect to each other—as well as the unit formed by the two cam disks co-ordinated to each other and the bearing sleeve carrying them in any angular position that is required. For that purpose—as shown in FIG. 2 especially—each of the two cam disks shaped as a ring disk has a radial through slit 8, whereby they are respectively provided with a screw 9 which passes through the two ends 9a, 9b of the ring disk in the area of the slit zone. Thus, the two ring disks can be clamped and fastened to the bearing sleeve 7 by tightening the screw 9. The sleeve 7 carries at one end a ring flange 10 the inner surface 10a of which is supported against the outer surface 10b of the neighbouring ring disk 4b. The ring flange has likewise a radial through slot 8 and can, in its turn, be clamped on the cam shaft by means of a screw 9, that passes approximately in tangential direction through the two ends of the ring flange in the area of the slot. The outer diameter of the ring flange 10 corresponds to the outer diameter of the ring disks 4a, 4b bearing the cam. The cams 6a, 6b projecting radially outwards from the peripheral edge of the ring disks 4a, 4b extend over a length smaller than the ring disks carrying them, if measured in the direction of the arrow 5, that is the axis of the shaft (see FIG. 1), for example, over half the length, whereas, if measured in a radial direction, they are almost twice as high as the corresponding ring disk, as may be seen in FIG. 2.

FIG. 1 especially shows that the case 11 is shaped like a prism. It can be mounted on the machine to be controlled as if it were a part of a building-box. The front wall 12 of the case is fastened to the case by means of the screws 13 and can be easily removed.

The cam shaft 1 going transversally the case of the device is rotatably supported at 14a, 14b on the case walls 12 and 15 opposite to each other, whereby the part of the shaft lying within the case carries several control cams arranged side by side. The embodiment represented in FIGS. 1 and 2 is provided with eight of these cams. However, the arrangement of the control cams can consist also of a smaller or higher number of cams, four for instance, or ten or twelve. Mechanisms or means for actuating the cam shaft can engage the shaft ends projecting out of the case. The right-hand actuating mechanism or means in FIG. 1 is a driving motor 16 detachably mounted on the case. This driving motor can be arranged in direct or indirect connection with the cam shaft: indirect, if a driving gear is inserted therebetween whereby the number of revolutions can be varied by momentarily changing the tooth wheels; or direct, if the actuating mechanism is an electromotor with infinitely variable speed, especially for laboratories and experimental work shops when the most suitable and favorable number of revolutions has to be found empirically. The left hand end of the camshaft 1 (FIG. 1) carries a transmission wheel 17 which may be shaped, for example, as a chain wheel or as a pulley and can be driven by a separate driving gear via suitable transmission elements, for example, in form of a chain or a belt. With the screw 18 loosened, the transmission wheel 17 can be taken off the shaft and replaced by a hand-wheel by means of which the shaft can be turned or rotated manually. Such a manual operation is advantageously used whenever the machine in question has to be set or reset. The drive via the transmission wheel 17 is convenient in the case the machine is already provided with a slowly rotating driving shaft. One of the shaft ends projecting out of the case may also be coupled with a pneumatic rotary piston motor with infinitely variable speed or with a pneumatic actuating cylinder with pawl operating in the manner of a step-by-step drive. This latter mode of drive is to be preferred whenever the cam shaft 1 is to be moved and rotated not continuously but only step-by-step. The drive by means of a pneumatic rotary piston motor is advantageous firstly in shops that are explosion-proof. In that case the speed can be infinitely varied by means of a pressure regulator of known type.

According to FIG. 1 it is evident that the cam shaft is adjusted in its bearings on the case walls in such a manner that it can be taken off and changed in a wink. Thus, a complete program can be changed to another one within some few minutes by adequately adjusting the length and the angular position of the cams on the cam shaft and by preparing a suitable second program shaft outside the device in question. Thus, with the arrangement according to the invention the length of the cams, i.e. the time interval is infinitely variable between 0 and 360 deg. and the moment of starting and stopping the program with constant lengths of cams is infinitely changeable, whereby it is possible to get a steady graduation from 0–180 deg. and 180–360 deg. by selectively actuating an opening and closing valve through the cam disks.

Moreover, with an arrangement in accordance with the invention it is unnecessary to manufacture the disk cams out of a solid blank, and it is possible, furthermore, to correct the point and the period of time afterwards, whereby only a screw driver is needed therefor.

According to FIG. 3, the device 21 according to the invention is added to the working cylinder to be controlled through the medium of a so-called pneumatic relay valve 19. Such a control arrangement is of advantage whenever larger working cylinders are in question, to which the relatively small switching and actuating devices represented in FIGS. 1 and 2, can be applied despite their relatively small size. The valve 19 can be mounted close to the working cylinder 20 so that the conduits 22, 23 can be kept short, a fact, by which the air consumption is reduced. Between the switching and actuating device 21 and the valve 19 only a thin conduit 24 is needed, which may consist, for example, of a hose made of artificial material. In FIG. 4 the device 25 according to the invention is directly mounted on the working cylinder 26. In that case there are provided two control conduits 27, 28. Such an arrangement is advantageous with smaller working cylinders.

All the facts set forth in the preceding lines result in that—besides the vast field of application—the device according to the invention has the additional advantage to be very compact and space saving, simple in its construction and low in manufacture. Moreover, the making of the cams is less complicated than it is with the comparable known cam disks. The infinitely variable setting and resetting of the cam disks on the camshaft can be accomplished with a minimum of time and with a minimum of simple implements; a sole screw-driver being practically sufficient.

Figure 6:
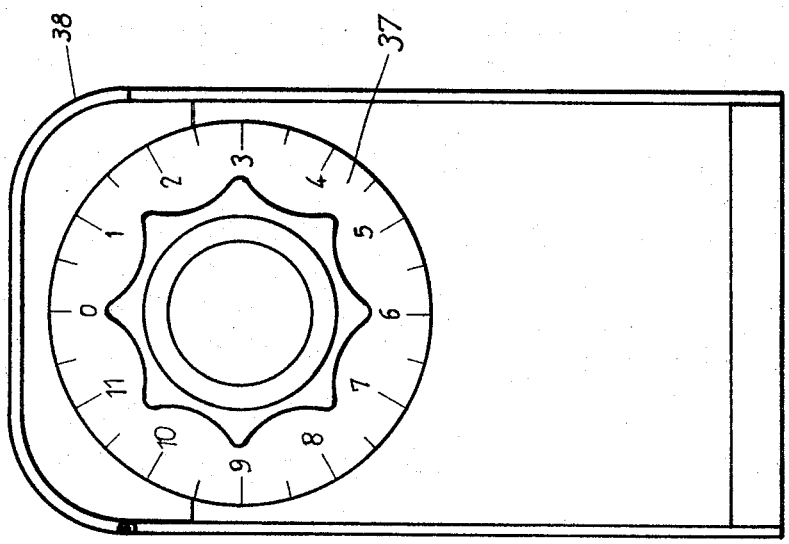

The advantages of the time dependent control system may be combined with those of the way dependent control system by so arranging limit switches that it is possible according to the working conditions to survey and scan some or all phases of movement of the pneumatic cylinders, for example, by providing a revertive communication or signal indicating whether the stroke or movement is fully accomplished or not. If this should not be the case, the switching and actuating device designed as a so-called program control mechanism is stopped so that the movements cannot interfere with each other. According to the arrangement of FIGS. 5, 6, 7, to the cam shaft 30 with the control cams 31 there is allotted and associated a series of eight pneumatic valves 32 and, moreover, a second series of three limit switches 33. The motor 34 drives the shaft by means of the driving gear 35. The shaft may also be turned by means of the hand-wheel 36 to which a dial 37 is allotted and associated, by means of which the position of the hand-wheel may be exactly determined. The limit switches have the function to stop the drive of the device immediately after the beginning of the working operation until its ending, or to stop the operation after the lapse of a predetermined period of time measured from the beginning of the working operation in question, unless the end of that working operation is electrically signalled within that period of time. The case of the device is represented at 38.

Although my invention has been illustrated and described with reference to the preferred embodiments thereof I wish to have it understood that it is in no way limited to the details of such embodiments, but is capable of numerous embodiments within the scope of the appended claims.

Having thus fully disclosed my invention, what I claim is:

1. A switching and actuating device for determining the exact sequence of pneumatically controlled working operations pertaining to a working program, comprising in combination; a camshaft; control cams on said camshaft; pneumatic switching and controlling organs for controlling said working operations, said control cams serving to actuate in due timed relationship said pneumatic and switching organs; the improvement characterized by a bearing sleeve turnably mounted on said camshaft; means to releasably secure the sleeve on the shaft in adjusted position; said cams consisting each of two cam disks coaxially associated with each other and arranged so as to succeed to one another in the axial sense and bearing with their front surfaces against each other, said cam disks being turnably mounted on said sleeve so as to be rotatable about the axis of said camshaft with respect to one another and to said sleeve; means to fix the cam disks individually in adjusted angular positions on the sleeve and cam portions on said cam disks extending over a sector corresponding to a central angle of approximately 180 degrees, whereby, when said cam disks are fixed on said sleeve, the sleeve can be adjusted angularly on the shaft without disturbing the relative setting of the cam disks, each said cam disk being shaped as a ring disk having a radial through slot and said fixing means comprising a screw passing approximatively tangentially through the two ends of said disks in the area of the said slot, said sleeve having a ring flange on one end which bears with its inner surface against the outer surface of the neighboring ring disk.

2. The switching and actuating device set forth in claim 1, wherein the said cam portions project radially outwards from the peripheral edges of the said cam disks and extend in axial direction over a smaller length than the ring disks carrying them, whereas in radial direction they are substantially twice as high as the corresponding ring disks.

3. The switching and actuating device set forth in claim 1, wherein the outer diameter of the said ring flange corresponds to the outer diameter of the said ring disks carrying the said cam portions.

4. A switching and actuating device for determining the exact sequence of pneumatically controlled working operations pertaining to a working program, comprising in combination; a camshaft; control cams on said cam-shaft; pneumatic switching and controlling organs for controlling said working operations, said control cams serving to actuate in due timed relationship said pneumatic and switching organ; the improvement characterized by a bearing sleeve turnably mounted on said camshaft; means to releasably secure the sleeve on the shaft in adjusted position; said cams consisting each of two cam disks coaxially associated with each other and arranged so as to succeed to one another in the axial sense and bearing with their front surfaces against each other, said cam disks being turnably mounted on said sleeve so as to be rotatable about the axis of said camshaft with respect to one another and to said sleeve; means to fix the cam disks individually in adjusted angular positions on the sleeve and cam portions on said cam disks extending over a sector corresponding to a central angle of approximately 180 degrees, whereby, when said cam disks are fixed on said sleeve, the sleeve can be adjusted angularly on the shaft without disturbing the relative setting of the cam disks, said device having a case, the said camshaft passing transversally through the case and being rotatably supported on opposite case walls of the case, the part of the camshaft lying within the case carrying several control cams arranged in a row, the two ends of said shaft projecting out of the casing, and actuating mechanisms engaging such projecting ends serving to actuate the said shaft.

5. A switching and actuating device for determining the exact sequence of pneumatically controlled working operations pertaining to a working program, comprising in combination; a camshaft; control cams on said camshaft; pneumatic switching and controlling organs for controlling said working operations, said control cams serving to actuate in due timed relationship said pneumatic and switching organs; the improvement characterized by a bearing sleeve turnably mounted on said camshaft; means to releasably secure the sleeve on the shaft in adjusted position; said cams consisting each of two cam disks coaxially associated with each other and arranged so as to succeed to one another in the axial sense and bearing with their front surfaces against each other, said cam disks being turnably mounted on said sleeve so as to be rotatable about the axis of said camshaft with respect to one another and to said sleeve; means to fix the cam disks individually in adjusted angular positions on the sleeve and cam portions on said cam disks extending over a sector corresponding to a central angle of approximately 180 degrees, whereby, when said cam disks are fixed on said sleeve, the sleeve can be adjusted angularly on the shaft without disturbing the relative setting of the cam disks, and wherein to the said camshaft there is allotted additionally a number of electrical limit switches which stop the drive of the said switching and actuating device immediately after the beginning of the respective working process until it is over, or stop the said drive after the lapse of a predetermined period of time measured from the beginning of the working operation, unless the end of the working operation is electrically signalled within that period.

6. The switching and actuating device set forth in claim 4, a drive motor, means for releasably coupling one end of the said camshaft projecting out of the said case to the drive motor, and means mounting said motor detachably on the said case.

7. The switching and actuating device set forth in claim 6, a transmission wheel removably mounted on one end of the said camshaft projecting out of the said case, a drive motor, and transmission means connecting the removable transmission wheel to the motor.

8. The switching and actuating device set forth in claim 4, a detachable and removable hand-wheel mounted on one of said projecting ends by means of which the said shaft can be manualy turned.

9. The switching and actuating device set forth in claim 4, a pneumatic rotary piston motor with infinitely variable speed, and means to couple one of the ends of the said cam shaft projecting out of the case to said piston motor.

10. The switching and actuating device set forth in claim 4, a pneumatic rotary piston motor with infinitely variable speed, and means to couple one of the ends of the said cam shaft projecting out of the case to said piston motor.

References Cited
UNITED STATES PATENTS

| | | | |
|---|---|---|---|
| 2,141,024 | 12/1938 | Staley | 74—568 X |
| 2,216,318 | 10/1940 | Lewis | 74—568 |
| 2,407,908 | 9/1946 | Ventres | 74—568 X |
| 2,585,607 | 2/1952 | Whitmore et al. | 74—568 X |
| 2,857,784 | 10/1958 | Brailsford | 74—568 |
| 3,104,298 | 9/1963 | Aldous | 74—568 X |
| 3,128,638 | 4/1964 | King | 74—568 |

FRED C. MATTERN, Jr., *Primary Examiner.*

F. E. BAKER, W. S. RATLIFF, *Assistant Examiners.*